United States Patent
Belcher et al.

(10) Patent No.: US 10,590,993 B1
(45) Date of Patent: Mar. 17, 2020

(54) BEARING RACE COOLING

(71) Applicants: Rolls-Royce Corporation, Indianapolis, IN (US); Rolls-Royce North American Technologies Inc., Indianapolis, IN (US)

(72) Inventors: Bradley D. Belcher, Danville, IN (US); Robert T. Duge, Carmel, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 16/119,583

(22) Filed: Aug. 31, 2018

(51) Int. Cl.
*F16C 37/00* (2006.01)
*F16C 33/58* (2006.01)

(52) U.S. Cl.
CPC .......... *F16C 37/007* (2013.01); *F16C 33/583* (2013.01); *F16C 2360/23* (2013.01)

(58) Field of Classification Search
CPC ... F16C 37/007; F16C 33/583; F16C 2360/23
See application file for complete search history.

(56) References Cited

U.S. PATENT DOCUMENTS

| | | | |
|---|---|---|---|
| 969,763 A | 9/1910 | Newmann | |
| 2,352,206 A * | 6/1944 | Kendall | F16H 57/0469 384/476 |
| 2,744,796 A | 5/1956 | Walters | |
| 3,276,827 A | 10/1966 | Diver | |
| 3,404,925 A | 10/1968 | Bailey | |
| 3,480,342 A * | 11/1969 | Venable | F16C 33/32 384/476 |
| 4,129,344 A | 12/1978 | Hörmann | |
| 4,194,797 A | 3/1980 | Hörmann | |
| 4,222,705 A | 9/1980 | Smith | |
| 4,340,262 A | 7/1982 | Rugh | |
| 4,458,959 A * | 7/1984 | Roling | F16C 19/163 384/621 |
| 4,463,994 A | 8/1984 | Eliason | |
| 4,541,738 A | 9/1985 | Liebensperger | |
| 4,838,028 A | 6/1989 | Witt | |
| 8,662,756 B2 | 3/2014 | Care | |
| 9,366,295 B2 | 6/2016 | Sebald | |
| 10,287,912 B2 * | 5/2019 | Beer | B22F 3/1055 |
| 2011/0142386 A1 | 6/2011 | Flouros | |
| 2013/0287328 A1 | 10/2013 | Frank | |

(Continued)

FOREIGN PATENT DOCUMENTS

| | | |
|---|---|---|
| CA | 2776857 A1 | 6/2011 |
| EP | 3184835 A1 | 10/2016 |
| WO | 2004104434 A1 | 12/2004 |

*Primary Examiner* — Thomas R Hannon
(74) *Attorney, Agent, or Firm* — Brinks Gilson & Lione

(57) ABSTRACT

A cooling architecture can include a longitudinally extending radially inner shaft, a radially outer support, and a bearing assembly. The longitudinally extending radially inner shaft can include an inner race. The inner race can define an inner circumferential chamber configured to carry an inner working fluid. The radially outer support can include an outer race. The bearing assembly can include a plurality of roller bearings disposed radially between the inner race and the outer race. The bearing assembly can be configured to radially align the inner shaft with respect to the outer support.

18 Claims, 18 Drawing Sheets

(56) References Cited

U.S. PATENT DOCUMENTS

2015/0330252 A1 11/2015 Manchikanti
2017/0082065 A1 3/2017 Swift
2018/0010525 A1 1/2018 Madge

* cited by examiner

BEARING RACE COOLING

BACKGROUND

Field of the Disclosure

The present disclosure relates to cooling for bearing assemblies.

Description of Related Art

Energy conversion devices (e.g., electrical generators, engines) often incorporate rotating shafts for mechanical power transmission. Rotating shafts can be supported by inner structure (e.g., a rod extending through a hollow rotating shaft) or outer structure (e.g., a collar surrounding a circumference of a rotating shaft). Supporting structure can be static or rotating.

Rotation of a shaft with respect to its support generates friction, which (a) wastes energy that would otherwise be transmitted by the shaft and (b) damages the shaft and/or the support. To reduce friction and enable smooth rotation, bearing assemblies can be disposed between a rotating shaft and a support. Examples of bearing assemblies appear in U.S. Pub. No. 2018/0010525 to Madge, U.S. Pat. No. 8,662,756 to Care, and U.S. Pub. No. 2017/0082065 to Swift.

SUMMARY

A cooling architecture can include a longitudinally extending radially inner shaft, a radially outer support, and a bearing assembly. The longitudinally extending radially inner shaft can include an inner race. The inner race can define an inner circumferential chamber configured to carry an inner working fluid. The radially outer support can include an outer race. The bearing assembly can include a plurality of roller bearings disposed radially between the inner race and the outer race. The bearing assembly can be configured to radially align the inner shaft with respect to the outer support.

A method can include: determining frictional heat generation of a bearing assembly radially disposed between an inner component and an outer component, at least one of the inner component and the outer component comprising a rotating shaft, the bearing assembly radially supporting the rotating shaft; modulating flow of an intermediate working fluid to minimize the frictional heat generation, the intermediate working fluid directly lubricating and cooling the bearing assembly; modulating flow of a second working fluid based the minimized frictional heat generation and a cooling capacity of the intermediate working fluid at the modulated flow. The method can be performed by a processing system.

A method of using a cooling architecture can include flowing an inner working fluid through an inner circumferential chamber defined in an inner race of a longitudinally extending radially inner shaft. The cooling architecture can include: a radially outer support comprising an outer race; and a bearing assembly comprising a plurality of roller bearings disposed radially between the inner race and the outer race. The bearing assembly can radially aligning the inner shaft with respect to the outer support.

A rotational system can include a longitudinally extending radially inner shaft including an inner race; a radially outer support including an outer race; and a bearing assembly including a plurality of roller bearings disposed radially between the inner race and the outer race. The bearing assembly can be configured to radially support the inner shaft during rotation thereof.

A method of using the rotational system can include: flowing at least partially liquid refrigerant into a circumferential chamber defined in the inner race or the outer race; and flowing the refrigerant from the circumferential chamber into a passage leading from the circumferential chamber to the bearing assembly such that at least some of the refrigerant directly contacts the bearing assembly.

The passage can extend about a complete circumference defined by the inner or outer race. The passage can be radially tapered such that one radial end of the passage defines a smaller refrigerant flow area and the other end of the passage defines a larger refrigerant flow area. The passage can be slanted with respect to the radial axis. The liquid refrigerant can enter the circumferential chamber in a saturated liquid state and/or depart the passage in an at least partially liquid state.

The refrigerant can expand immediately upon departing the passage. The expanded refrigerant can both cool the bearing assembly and form a fluid cushion. The fluid cushion can be radially disposed between one of the roller bearings and the inner race or one of the roller bearings and the outer race.

BRIEF DESCRIPTION OF THE DRAWINGS

Various Figures use "L" for the longitudinal (also called "axial") dimension, "R" for the radial dimension, and "C" for the circumferential dimension. The claimed inventions are not limited to the depicted longitudinal, radial, and circumferential orientations.

DETAILED DESCRIPTION

Illustrative (i.e., example) embodiments are discussed below and shown in the figures. The claims are not limited to the illustrative embodiments. Therefore, some implementations of the claims will have different features than in the illustrative embodiments. Changes to the claimed inventions can be made without departing from their spirit. The claims are intended to cover implementations with such changes.

At times, the present application uses directional terms (e.g., front, back, top, bottom, left, right, etc.) to give the reader context when viewing the Figures. The claimed inventions are not limited to any particular direction or orientation. Any directional term can be replaced with a numbered term (e.g., left can be replaced with first, right can be replaced with second, and so on). Any absolute term (e.g., high, low, etc.) can be replaced with a corresponding relative term (e.g., higher, lower, etc.).

Figure 2:
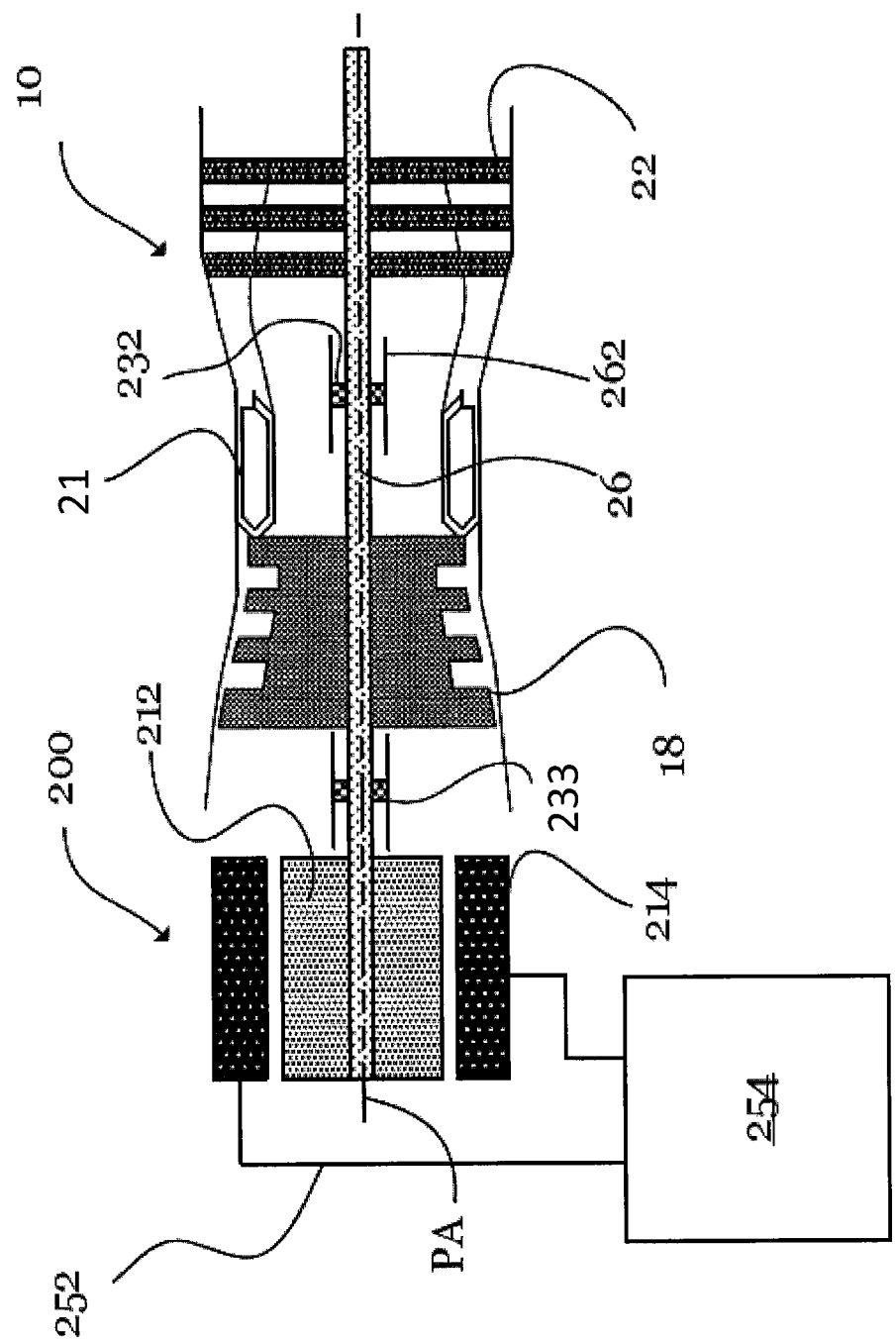
FIG. 2 is a cross-sectional schematic view of an exemplary hybrid engine.

As shown in FIG. 2, a gas turbine engine 10 can be mechanically coupled with an electric generator 200 via shaft 26. Gas turbine engine 10 can include a compressor 18 linked with a turbine 22 via a shaft 26. A combustor 21 can be disposed intermediate compressor 18 and turbine 22.

Electric generator 200 can include a rotor 212 and a stator 214. One of rotor 212 and stator 214 can include magnets and the other of rotor 212 and stator 214 can act as an armature. During operation, turbine 22 can drive rotor 212 via shaft 26. The rotation of rotor 212 with respect to stator 220 can generate alternating electric current, which can be supplied via electrical lines 252 to one or more electrical consumption devices 254 (e.g., a battery and/or an electric motor coupled with a fan).

As shown in FIG. 2, shaft 26 and/or rotor 212 can be rotationally centered about principle axis PA by one or more bearing assemblies 233, which can be disposed within electric generator 200 and/or gas turbine 10. Bearing assemblies 233 can be radially disposed between the rotating component (e.g., shaft 26 or rotor 212) and static structure (e.g., engine casing 262, stator 214, or generator casing (not shown)).

Figure 1A:
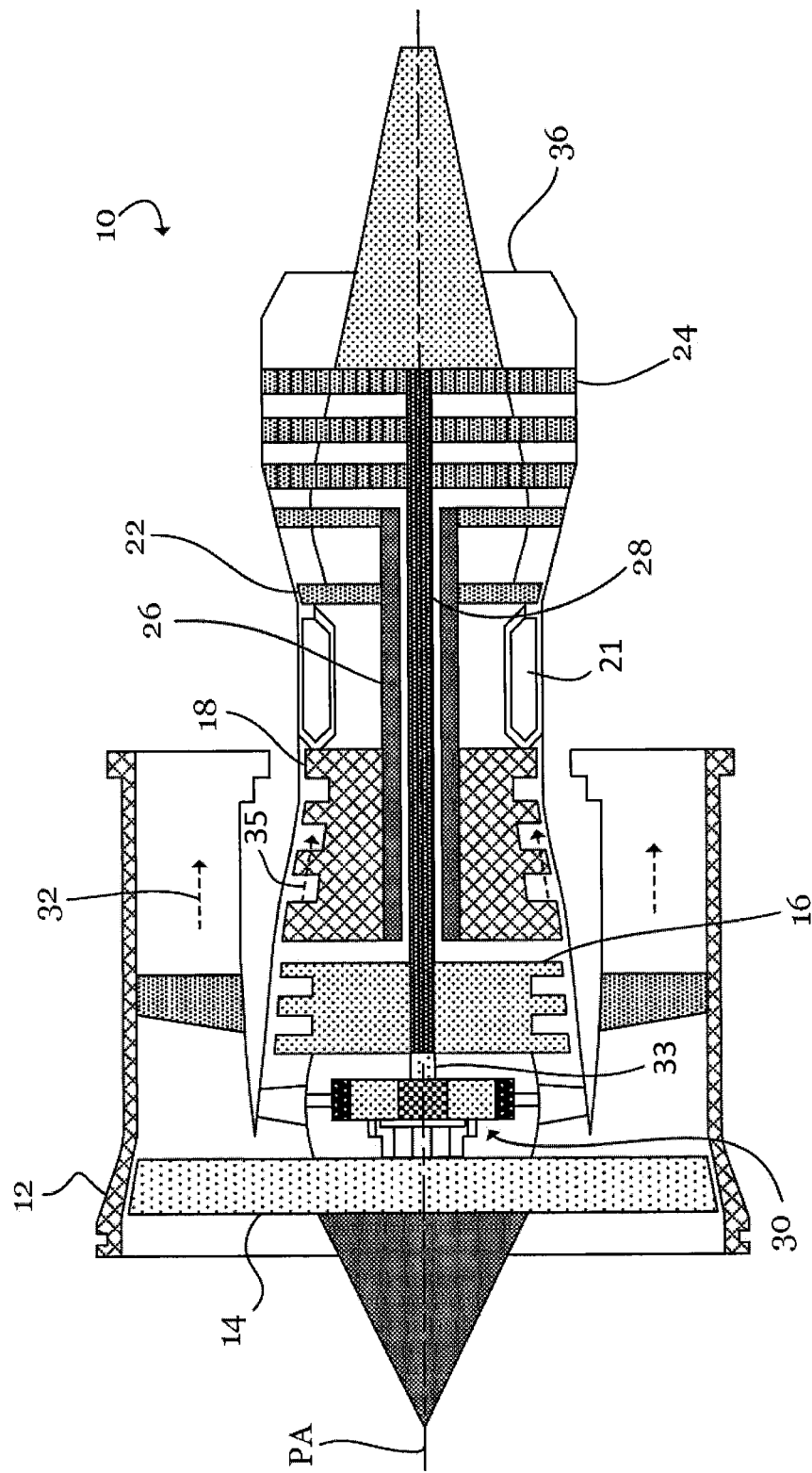
FIG. 1A is a cross-sectional schematic view of an exemplary gas turbine engine.
Figure 1B:
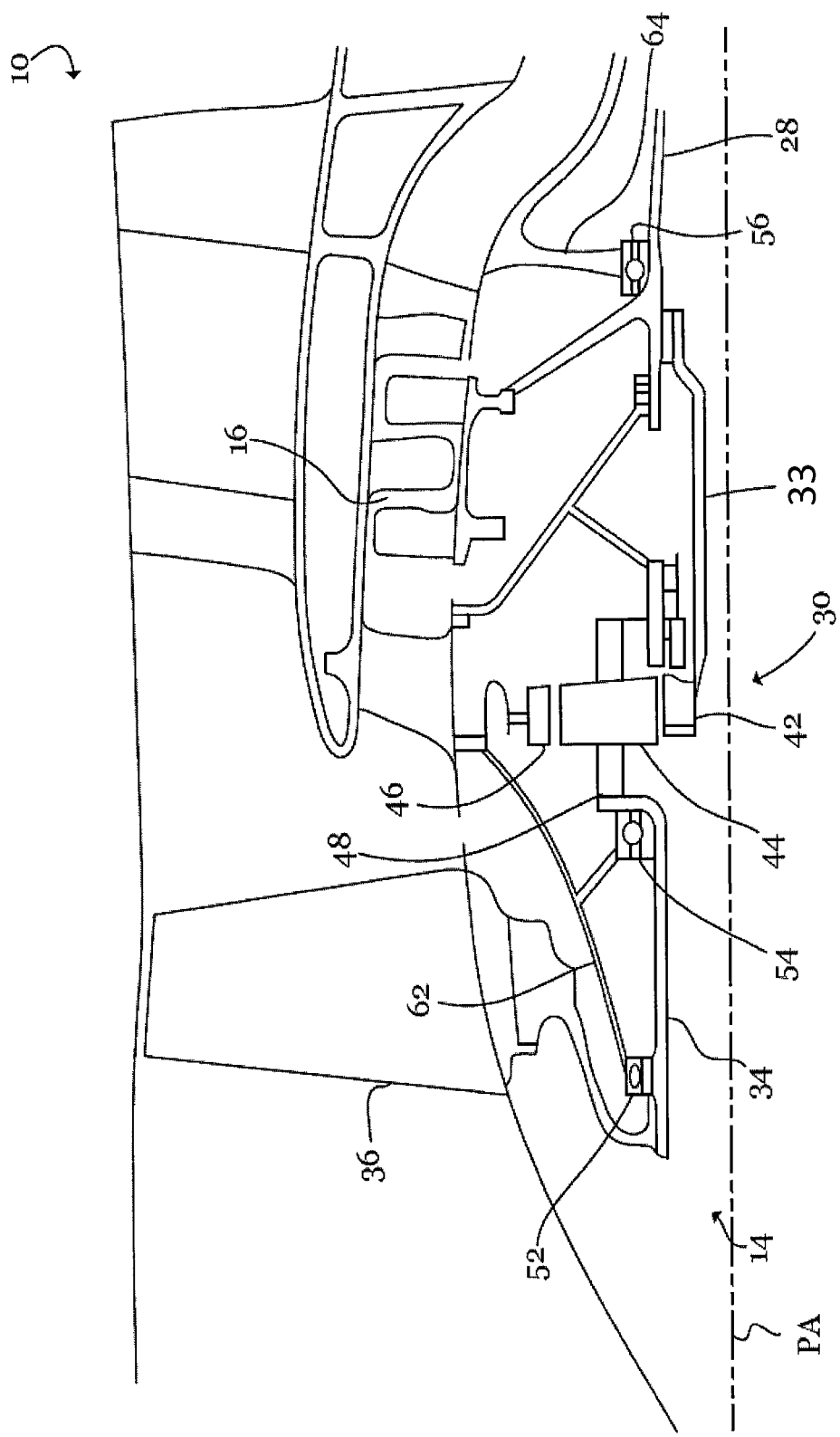
FIG. 1B is an enlarged cross-sectional schematic view of the exemplary gas turbine engine in FIG. 1A.

FIGS. 1A and 1B show another embodiment of gas turbine engine 10, which is structure as a turbofan (e.g., a geared turbofan). As shown in FIGS. 1A and 1B, a fan 14 can be disposed in a fan casing 12. Fan 14 can draw air into gas turbine engine 10. Air drawn into gas turbine engine 10 can separate between a bypass flow path 32 through fan casing 12 and a core flow path 35 through compressors 16, 18, combustor 21, and turbines 22, 24.

Combustor 21 can inject fuel into core air flow 34. Combustor 21 can ignite the fuel/air mixture to produce high pressure combustion products. The high-pressure combustion products can flow past high speed turbine 22, causing high speed turbine 22 to spin. The lower pressure combustion products exhausted from high speed turbine 22 can flow past low speed turbine 24, causing low speed turbine 24 to spin. Combustion products can leave gas turbine engine 10 via exhaust nozzle 36.

High speed turbine 22 and high speed compressor 18 can be mounted to opposing ends of high speed shaft 26. Low speed turbine 24 and low speed compressor 16 can be mounted to opposing ends of low speed shaft 28. Therefore, high speed turbine 22 can drive high speed shaft 26 along with high speed compressor 18. Similarly, low speed turbine 24 can drive low speed shaft 28 along with low speed compressor 16.

According to some embodiments (not shown), fan 14 is directly mounted to low speed shaft 28 such that torque delivered by low speed turbine 24 drives both fan 14 and low speed compressor 16 at a common speed. According to other embodiments, and as shown in FIGS. 1 and 2, a gearbox 30 is disposed intermediate fan 14 and low speed shaft 28.

Gearbox 30 can perform a speed reduction function, enabling fan 14 to rotate at a lesser speed than low speed compressor 16, which can improve the fuel efficiency of gas turbine engine 10. Fan 14, gearbox 30, low speed compressor 16, high speed compressor 18, low speed turbine 22, high speed turbine 24, low speed shaft 28, and high speed shaft 26 can be rotatable about engine principle axis PA.

Referring to FIG. 1B, gearbox 30 can receive rotational energy from low speed shaft 28 via an input coupling 33 and transmit rotational energy to fan 14 via fan shaft 34. Gearbox 30 can include an epicyclical gear system, such as a star gear system or a planet gear system. As shown, gearbox includes a planet gear system including a sun gear 42 meshed with a plurality of planet gears 44, which are each meshed with a ring gear 46. A carrier 48 can include a plurality of posts (not labeled). Each post can extend through a central aperture (not labeled) of one planet gear 44.

During operation, low speed spool 28 can rotationally drive sun gear 42. By virtue of being meshed between sun gear 42 and ring gear 46, planet gears 44 can orbit about sun gear 42 and each planet gear 44 can rotate about its central axis. Since carrier posts (not labeled) extend through planet gears 44, the orbital motion of planet gears 44 can cause carrier 48 to rotate about its central axis. Carrier 48 can be splined to fan shaft 34, from which fan blades 36 can radially extend.

Although not shown, a star gear system can share the same basic components as the planetary gear system of FIG. 1B. Therefore, the operation of a star gear system can be explained with reference to the element numbers in FIG. 1B. In a star gear system, each planet gear 44 (i.e., star gear) can be rotate in-place about a carrier post 48. Carrier 48 can be static. Ring gear 46 can be rotatable. During operation, rotation of sun gear 42 can cause each star gear 44 to rotate about a respective static carrier post 48. The rotation of star gears 44 can drive ring gear 46, which can be splined to fan shaft 34.

Referring to FIG. 1B, first and second bearing assemblies 52, 54 can radially support fan shaft 34. Third bearing assembly 56 can radially support low speed shaft 28. Gas turbine engine 10 can include many other bearing assemblies for radially supporting low speed shaft 28 at other locations and for radially supporting high speed shaft 26.

In FIG. 1B, first and second bearing assemblies 52, 54 can be roller bearing assemblies, with a plurality of bearings (not labeled) disposed between an inner race (not labeled) of fan shaft 34 and an outer race (not labeled) of first core static support structure 62. Third bearing assembly 56 can be a roller bearing assembly with a plurality of bearings (not labeled) disposed between an inner race (not labeled) of low speed shaft 28 and an outer race (not labeled) of second core static support structure 64.

Figure 3:
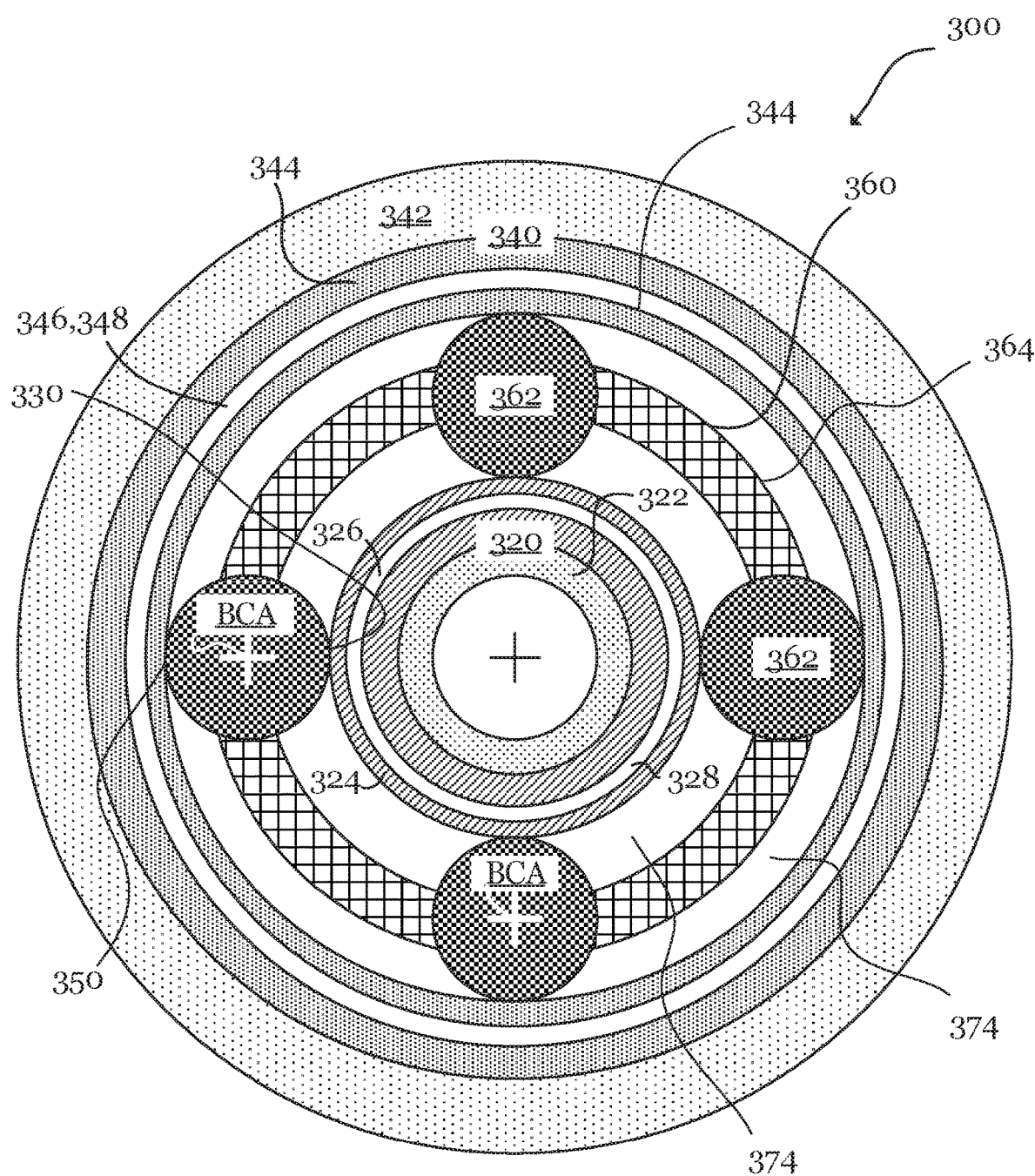
FIG. 3 is a cross-sectional schematic view of an exemplary first cooling architecture, which can be used in the engines shown in FIGS. 1A, 1B, and 2.
Figure 3:
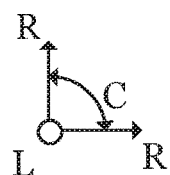

FIG. 3 illustrates an embodiment of a first cooling architecture 300 (also called a system, a rotational assembly, etc.), which can include an inner component ("IC") 320, an outer component ("OC") 340, and a bearing assembly 360 configured to rotatably support IC 320 with respect to OC 340. Both IC 320 and OC 340 can be rotatable about central axis CA, which can be collinear with principle axis PA. For example, IC 320 can be low speed shaft 28 and OC 340 can be high speed shaft 26. Alternatively, only one of IC 320 and OC 340 can be rotatable about central axis CA, which can be collinear with principle axis PA. For example, IC 320 can be a shaft and OC 340 can be outer support structure or OC 340 can be a shaft and IC 320 can be inner support structure.

According to some embodiments, central axis CA can be offset from, but parallel to, principle axis PA. For example, IC 320 can be a carrier post, OC 340 can be a planet or star gear, and CA can be the central axis of the carrier post. According to some embodiments, first cooling architecture 300 is employed in a non-gas turbine engine setting. Put differently, the claimed inventions can be applied to a geared turbofan (FIGS. 1A and 1B) or a gas turbine electric generator system (FIG. 2), but can be used in other contexts as well. The claimed inventions are not limited to any particular context unless otherwise explicit.

Figure 4:
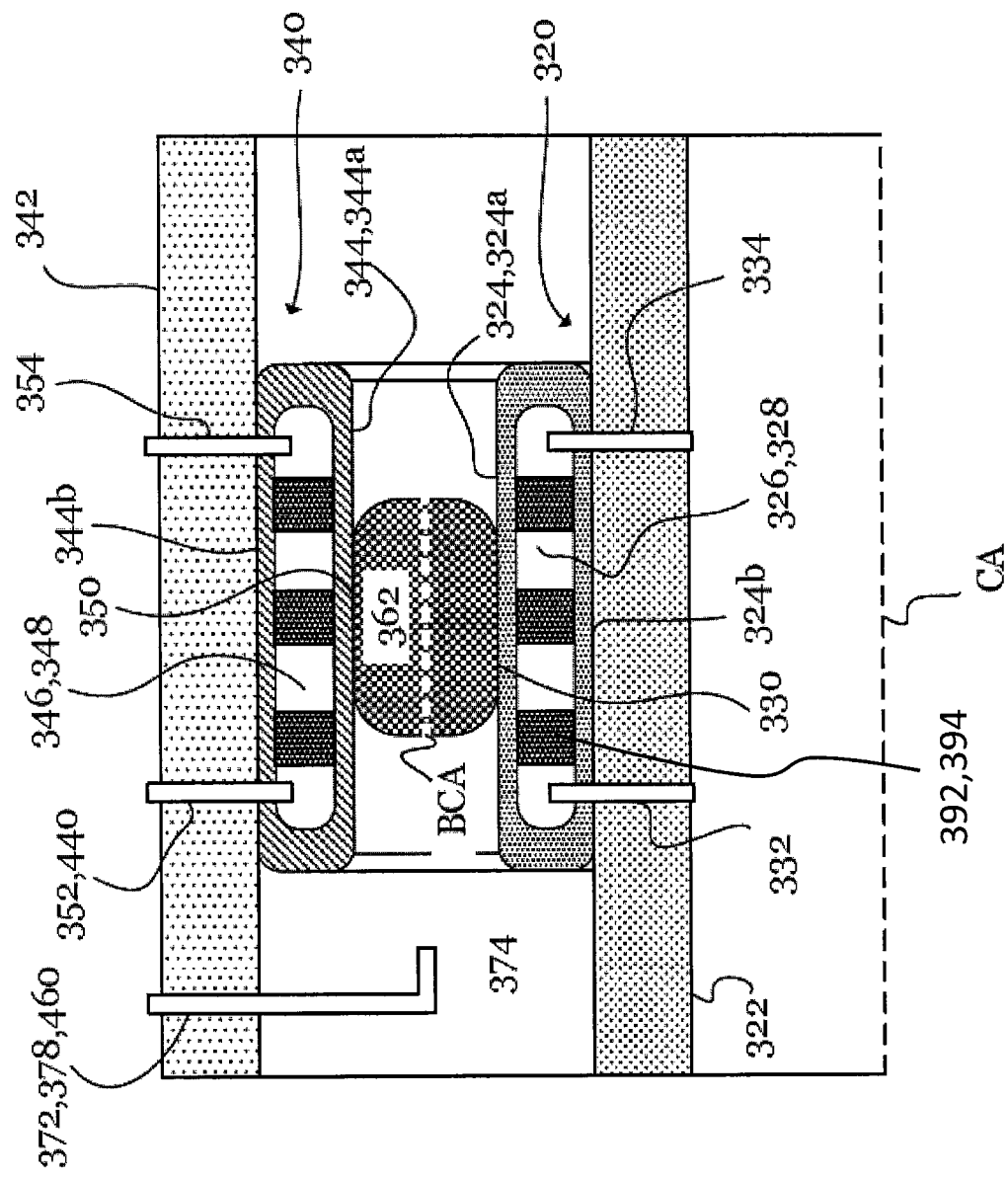
FIG. 4 is a cross-sectional schematic view of the exemplary first cooling architecture.

Referring to FIGS. 3 and 4, IC 320 can include a longitudinally extending inner base 322 and an inner race 324. Inner base 322 can be hollow or solid. Inner race 324 can be a collar disposed about (e.g., press-fitted about) a small longitudinal segment of inner section 322. Inner race 324 can be a groove defined in inner section 322. Inner race 324 can include (e.g., define) a longitudinally extending circumferential inner passage 326 for accommodating an inner working fluid 328. Inner race 324 can include an inner running surface 324a configured to contact bearings 362 and an inner mounting surface 324b secured to inner base 322.

Similarly, OC 340 can include a longitudinally extending outer base 342 and an outer race 344. Outer base 342 can have annular cross-section, as shown in FIGS. 3 and 4. Alternatively, the view of outer base 342 in FIGS. 3 and 4 can be fragmentary and the cross-section of outer base 342 can be any geometrical shape. Outer race 344 can be a collar disposed within (e.g., press-fitted within) a small longitudinal segment of outer section 342. Outer race 344 can be a groove defined in outer section 342. Outer race 344 can include (e.g., define) a longitudinally extending circumferential outer passage 346 for accommodating an outer working fluid 348. Outer race 344 can include an outer running surface 344a configured to contact bearings 362 and an outer mounting surface 344b secured to outer base 342. Inner working fluid 328 and outer working fluid 348 can be the same or different fluid.

Bearing assembly 360 can be representative of any bearing assembly in gas turbine engine 10, including first, second, and third bearing assemblies 52, 54, 56. Bearing assembly 360 can include a plurality of roller bearings 362. A cage 364 can maintain a fixed circumferential spacing relationship between roller bearings 362. Roller bearings 362 can have many different geometries such as spherical, cylindrical, cylindrical-tapered, and needle geometries. Cage 364 is omitted in various Figures, including FIG. 4.

During operation, one or both of IC 320 and OC 340 can rotate about central axis CA. IC 320 can contact (i.e., be configured to contact) bearings 362 via inner race 324 at inner contact regions 330. OC 340 can contact (i.e., be configured to contact) bearings 362 via outer race 344 at outer contact regions 350. Bearings 362 can maintain constant radial spacing between IC 320 and OC 340. Bearings 362, inner race 324, and outer race 344 can be configured to minimize friction generated at inner contact regions 330 and outer contact regions 350.

Each bearing 362 can be rotatable about a respective bearing central axis BCA within cage 320. Bearings 310 may rotate about bearing central axes BCA in response to torque transferred from IC 320 and/or OC 340. Cage 364 can be floating (i.e., rotationally independent of both IC 320 and OC 340). Thus, bearings 362 may orbit central axis CA while rotating about their respective bearing central axes BCA. Alternatively, cage 320 can be fixed to one of IC 320 and OC 340.

Over time, the friction generated at inner contact regions 330 and/or outer contact regions 350 can produce destructive amounts of heat, especially at rotational speeds present in a gas turbine engine 10. Various fluids can be supplied to first cooling architecture to (a) lubricate bearings 362 and races 324, 344 and/or (b) cool bearings 362 and races 324, 344. According to various embodiments, first cooling architecture 300 supplies one or more of (e.g., all of): inner working fluid 328 for directly cooling inner race 324, outer working fluid 348 for directly cooling outer race 344, and intermediate working fluid 378 for directly cooling and lubricating inner race 324, outer race 344, and bearings 362.

Referring to FIG. 4, an inner inlet 332 can supply cooled inner working fluid 328 to inner passage 326. An inner outlet 334 can withdraw heated inner working fluid 328 from inner passage 326. Inner inlet 332, inner passage 326, and inner outlet 334 can define at least a portion of an inner cooling cycle 420. Similarly, an outer inlet 352 can supply cooled outer working fluid 348 to outer passage 346. An outer outlet 354 can withdraw heated outer working fluid 348 from outer passage 346. Outer inlet 352, outer passage 346, and outer outlet 354 can define at least a portion of an outer cooling cycle 440.

Figure 5:
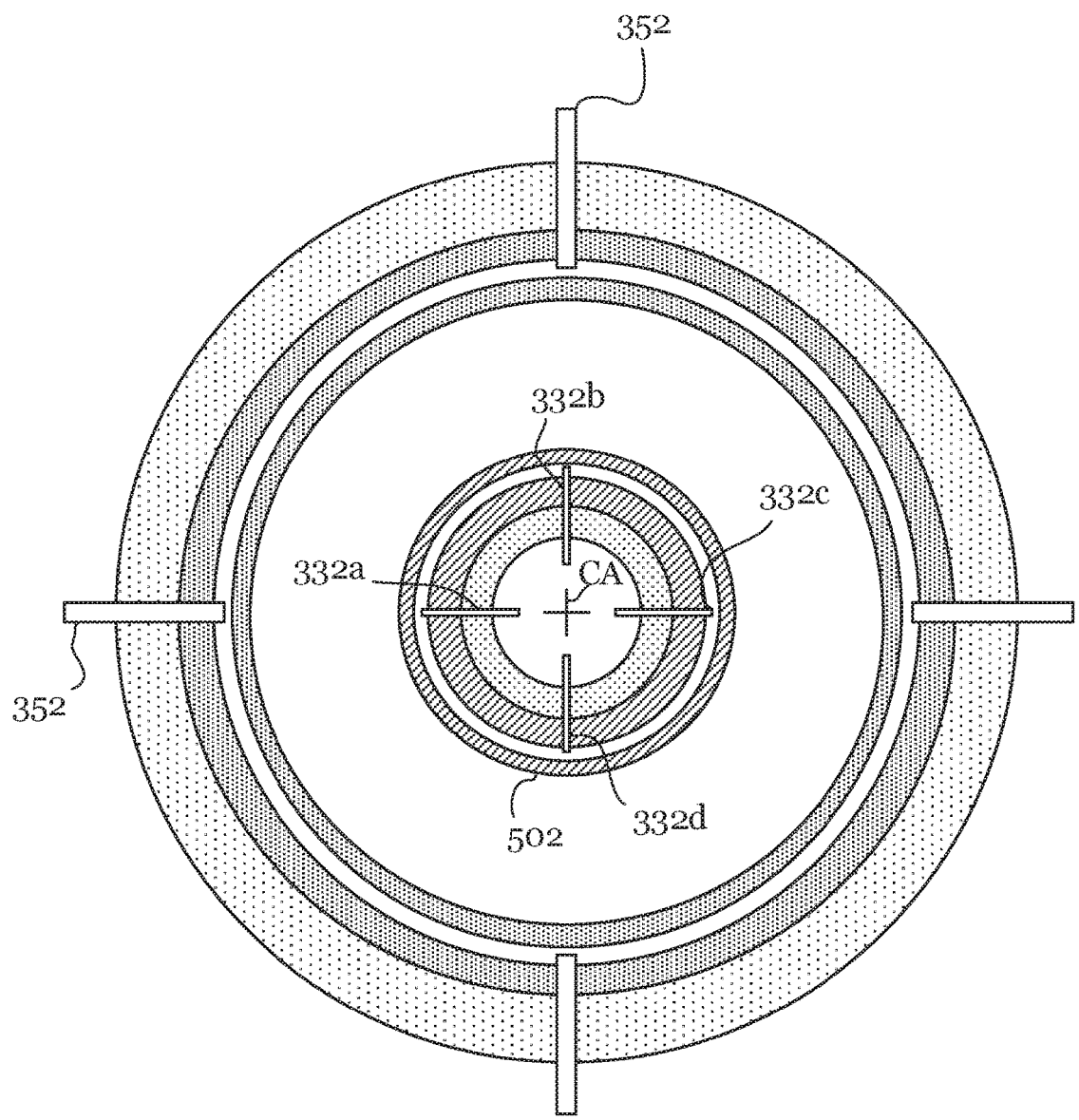
FIG. 5 is a cross-sectional schematic view of the exemplary first cooling architecture.

Inlets 332, 352 and outlets 334, 354 can be one or more tubes extending through bores (not labeled) in IC 320 and OC 340. As shown in FIG. 5, a plurality of inlets 332, 352 can be installed at periodic circumferential intervals. Although not shown, outlets 334, 354 can have the same arrangement (although at a different longitudinal position). As previously discussed, inner base 322 of IC 320 can be hollow. When hollow, inner base 322 can carry inner working fluid to and/or from inner passage 326. For example, one or more tubes can extend through inner base 322 to the one or more inlets 332 and one or more tubes can extend through inner base 322 to the one or more outlets 334.

According to some embodiments, inner and/or outer baffles 392, 394 can be installed within fluid chambers 326, 328 to direct fluid flow (see FIG. 4). When installed, baffles 392, 394 can have a helical shape to force inner and outer fluid 328, 348 to flow in a helical path between inlet 332, 352 and outlet 334, 354.

Similar to outer inlets 352, one or more intermediate inlets 372 (e.g., nozzles) can radially extend through OC 340. Each intermediate inlet 372 can extend through a complete radial thickness of OC 340 to spray cooled intermediate fluid 378 in the circumferential volume 374 defined between IC 320 and OC 340. Although not shown, one or more intermediate outlets can be provided to withdraw heated intermediate fluid 378 from circumferential volume 374. Intermediate inlet 372, circumferential volume 374, and intermediate outlets (not shown) can define at least a portion of an intermediate cooling cycle 460.

Inner working fluid 328 and outer working fluid 348 can be the same fluid such as air, water, synthetic refrigerant, or oil. Intermediate working fluid 378 can be a lubricant such as oil. Inner working fluid 328, outer working fluid 348, and intermediate working fluid 378 can each originate from the same source (e.g., reservoir or pump). Thus, inner cooling cycle 420, outer cooling cycle 440, and intermediate cooling cycle 460 can merge. Alternatively, inner working fluid 328, outer working fluid 348, and intermediate working fluid 378 can each be separately maintained and thus inner cooling cycle 420, outer cooling cycle 440, and intermediate cooling cycle 460 can each be fluidly distinct. According to some embodiments, inner cooling cycle 420 and outer cooling cycle 440 merge (and thus are in fluid communication) while intermediate cooling cycle 460 is fluidly distinct.

As shown in FIG. 4, chambers 326, 346 can extend beyond both longitudinal ends of bearing 362. Chambers 326, 346 can be completely defined within races 324, 344 such that no working fluid 328, 348 disposed within chambers 326, 346 contacts bases 322, 342. Chambers 326, 346 can be defined within races 324, 344 such that at least a portion (and in some embodiments, all) of working fluid 328, 348 therein is radially closer to bearing race running surfaces 324a, 344a than bearing race mounting surfaces 324b, 344b.

Figure 6A:
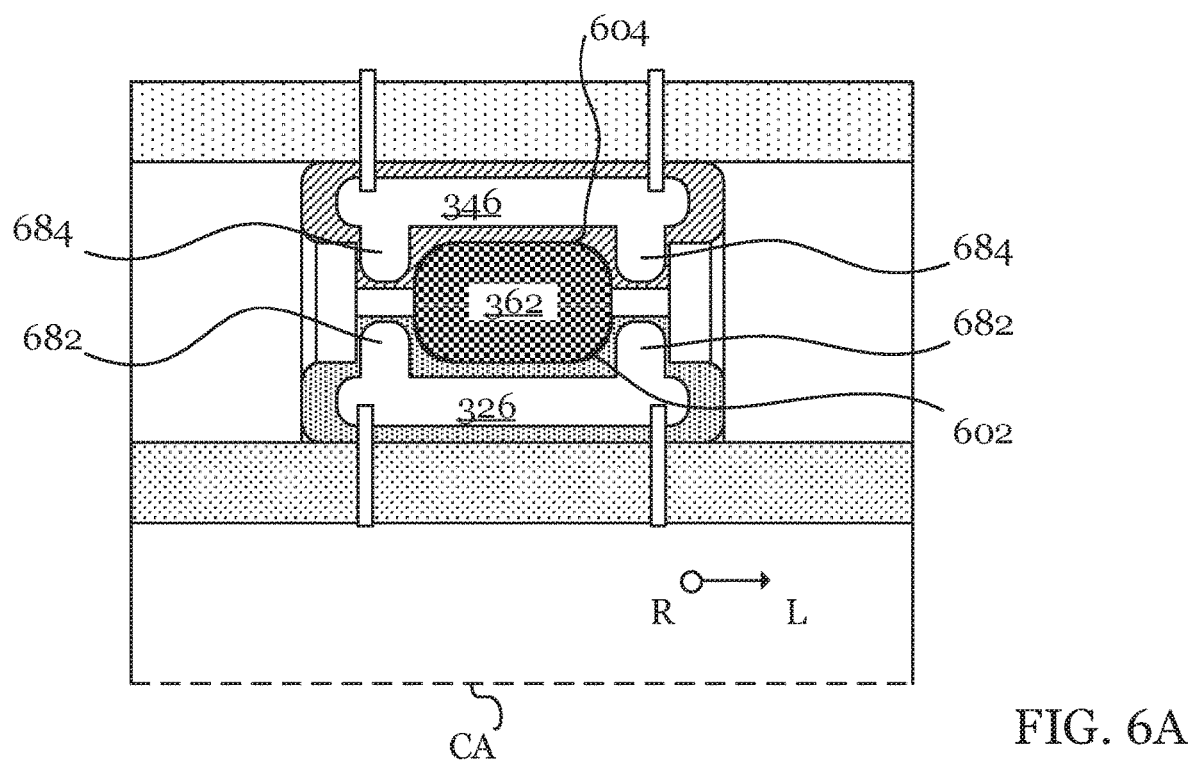
FIGS. 6A and 6B are cross-sectional schematic views of the exemplary first cooling architecture.
Figure 6B:
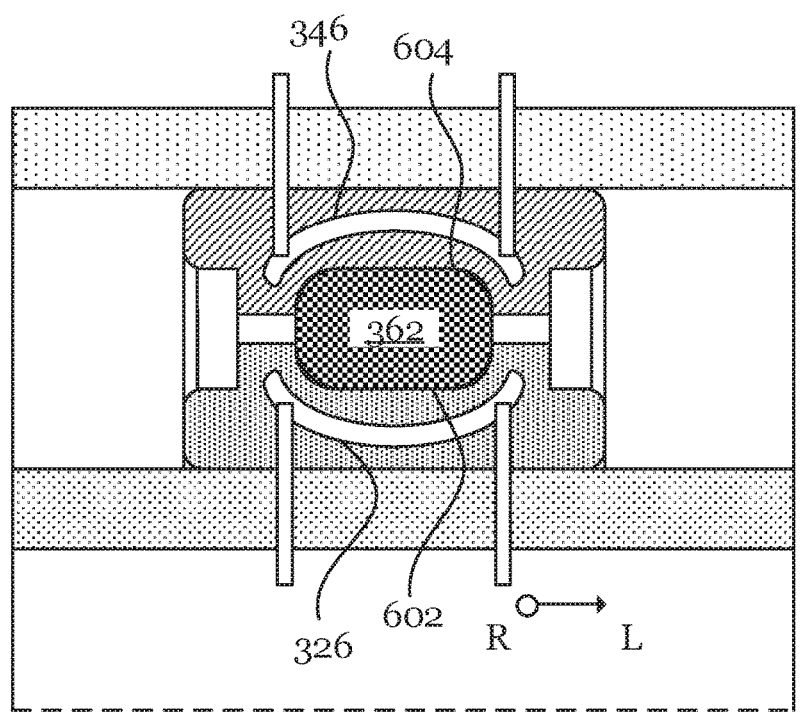

Referring to FIGS. 6A and 6B, one or both of inner race 324 and outer race 344 can define running channels 602, 604 for longitudinally retaining bearings 362. In these embodiments, one or both of inner chamber 326 and outer chamber 346 can have a U-shaped cross section to radially extend into the opposing rims defining running channels 602, 604. As shown in FIG. 6A, the U-shaped cross section can be defined by adding a pair of radially extending channels 682, 684 to chambers 326, 346. As shown in FIG. 6B, the U-shaped cross section can be defined by arcing chambers 326, 346 along the longitudinal direction such that the cross section of chambers 326, 346 is annular.

Figure 7:
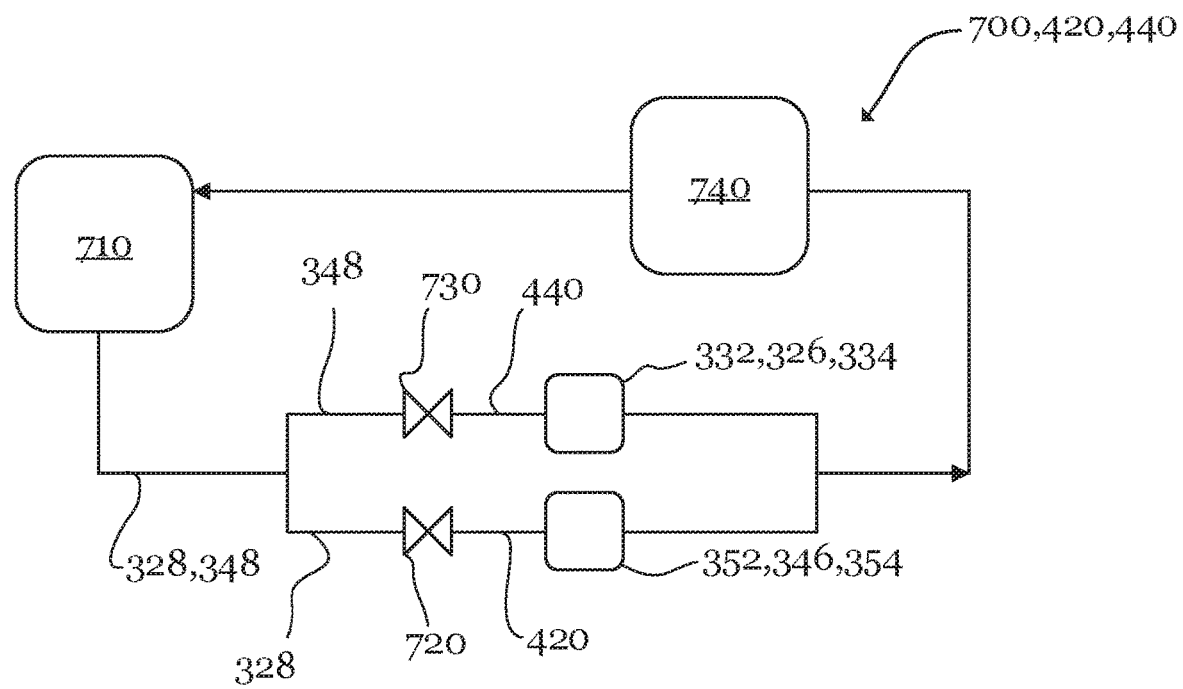
FIGS. 7 and 8 are schematics of exemplary fluid circuits for the first cooling architecture.

FIG. 7 illustrates an embodiment of a two-phase pump-loop system 700 forming both inner cooling cycle 420 and outer cooling cycle 440. Two-phase pump-loop system 700 can be controlled with a processing system ("PS") 20, which is further discussed below. PS 20 can control pump-loop system 700 to maintain one or more desired temperature profiles (e.g., to keep one or more temperatures of bearing assembly 300 below predetermined values).

The present disclosure refers to PS 20 controlling various fluid cycles to achieve certain fluid states (e.g., a saturated liquid state, a saturated vapor state). According to some embodiments, PS 20 exercises each of the disclosed controls based on temperature and/or pressure measurements of working fluid at the controlled location. For example, when the present disclosure states that PS 20 can control condenser 740 such that working fluid is in a saturated liquid state, such a disclosure should be understood to convey that a temperature and/or pressure sensor can be disposed at the outlet of the condenser 740 and PS 20 can control condenser 740 based on measurements from those sensor(s).

Referring to FIG. 7, PS 20 can control pump 710 to pressurize working fluid 328, 348 from a saturated liquid to a sub-cooled or saturated liquid. PS 20 can control one or more inner valves 720 to regulate flow of inner working fluid 328 into inner chamber 326 and one or more outer valves 730 can regulate flow of outer working fluid 348 into outer chamber 348. Inner valves 720 can be disposed fluidly upstream of inner inlets 332 and outer valves 730 can be disposed fluidly upstream of outer inlets 352. If sub-cooled, PS 20 can be configured to modulate valves 720, 730 to return working fluid 328, 348 into a saturated liquid state.

Inner and outer working fluids 328, 348 can absorb heat from inner and outer races 324, 344 while in inner and outer chambers 326, 346. PS 20 can control flow rate of inner and outer working fluids 328, 348 such that upon entering outlets 334, 354, inner and outer working fluids 328, 348 are in a saturated vapor state. Inner and outer working fluids 328, 348 can merge before being flowing through a condenser 740. PS 20 can control flow rate, temperature, and/or pressure of a counter-fluid through condenser 740 (e.g., air, a separate refrigerant) such that working fluid 328, 348 departing condenser 740 is in a saturated liquid state.

Figure 8:
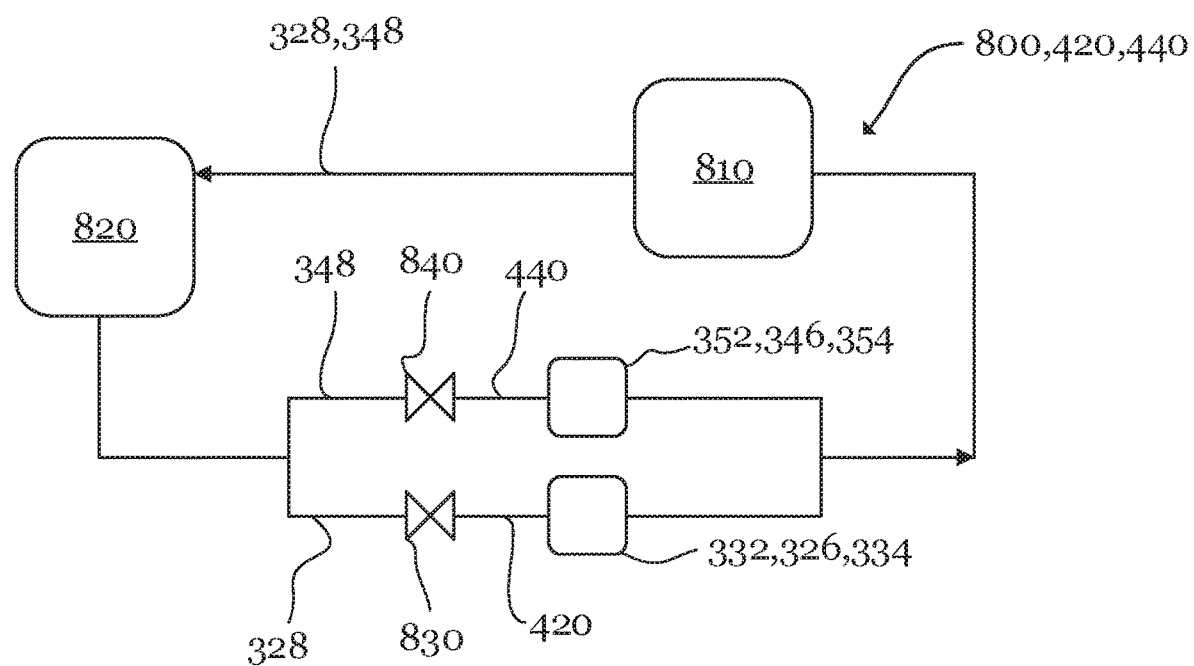

FIG. 8 illustrates an embodiment of a vapor-compression system 800 forming both inner cooling cycle 420 and outer cooling cycle 440. PS 20 can control vapor-compression system 800 to maintain one or more desired temperature profiles (e.g., to keep one or more temperatures of bearing assembly 300 below predetermined values).

Referring to FIG. 8, PS 20 can control compressor 810 to pressurize working fluid 328, 348 from a saturated vapor to a super-heated vapor. PS 20 can control condenser 820 to cool working fluid into a saturated liquid (e.g., by regulating flow, temperature, and/or pressure of a counter-fluid as discussed above). PS 20 can control one or more inner expansion valves 830 to depressurize inner working fluid 328 from a saturated liquid to a liquid/vapor mixture. PS 20 can control one or more outer expansion valves 840 to depressurize outer working fluid 348 from a saturated liquid to a liquid/vapor mixture. Expansion valves 830, 840 can be directly fluidly upstream of inlets 332, 352.

Inner and outer working fluids 328, 348 can absorb heat from inner and outer races 324, 344 while in inner and outer chambers 326, 346. PS 20 can control flow of inner and outer working fluids 328, 348 (e.g., by modulating expansion valves 830, 840) such that upon entering outlets 334, 354, inner and outer working fluids 328, 348 are in a saturated vapor state.

According to some embodiments (not shown), inner and outer cooling cycles 420, 440 are fluidly independent two-phase pump-loop systems or fluidly independent vapor-compression systems. PS 20 can control each independent system in the manner discussed above.

Figure 17:
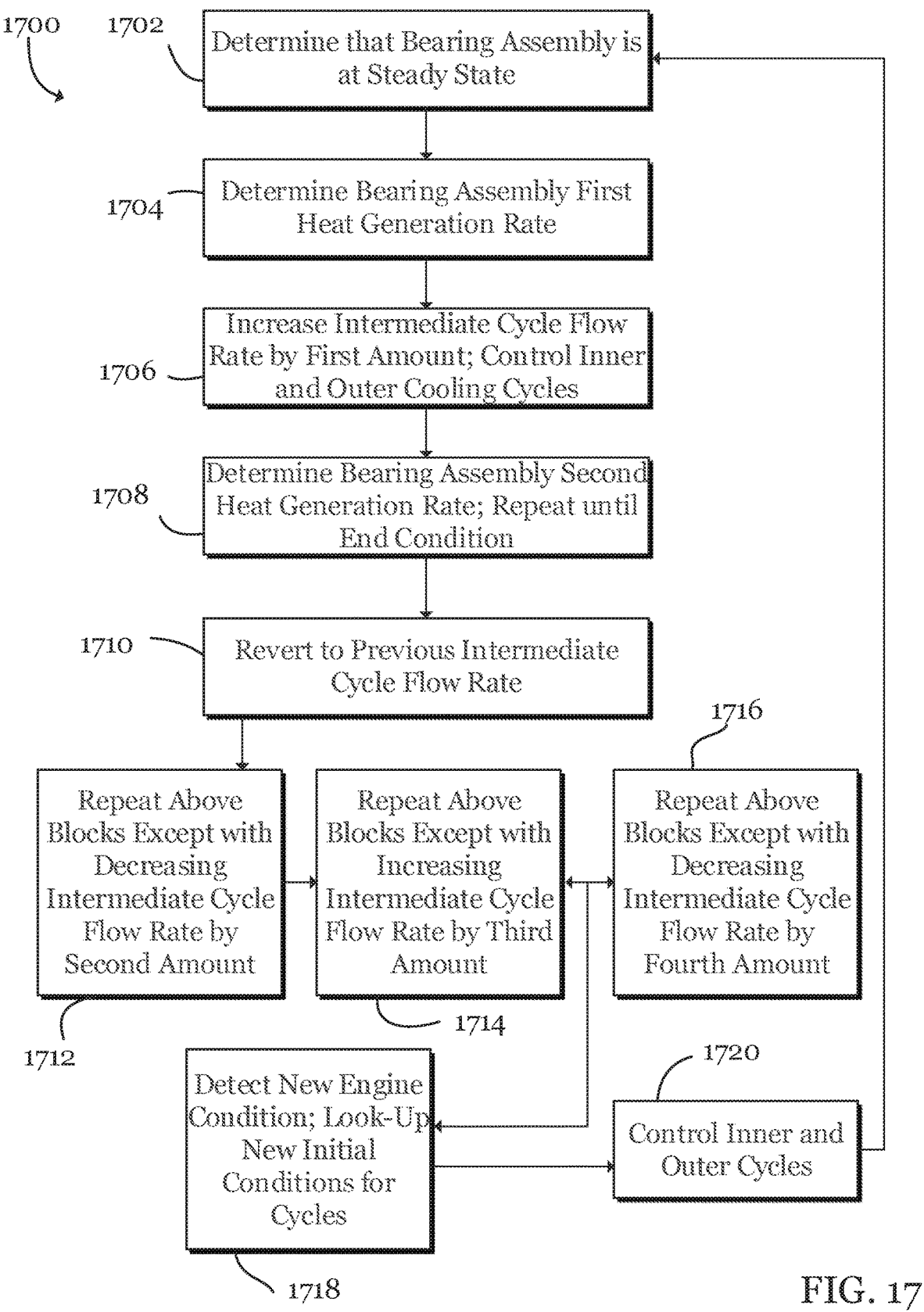
FIG. 17 is a block diagram of an exemplary method of controlling the first cooling architecture.

FIG. 17 shows an embodiment of a method 1700 of controlling cooling systems 700, 800 (see FIGS. 7 and 8). Method 1700 can cause intermediate cooling cycle 460 to supply an ideal amount of lubrication for bearing assembly 300 by relying on inner and outer cooling cycles 420, 440 to perform supplemental cooling. Such a control may be desirable when the flow rate of intermediate cooling cycle 460 for supplying ideal lubrication to bearing assembly 300 is different than the flow rate needed to supply ideal cooling to bearing assembly 300. In general, method 1700 can involve an iterative control process where a metric (e.g., flow rate) of intermediate cooling cycle 460 is adjusted upwards and/or downwards to minimize the heat generation of bearing assembly 300. Method 1700 can occur in parallel with any other methods disclosed herein.

At block 1702, PS 20 can determine that bearing assembly 300 has reached a steady state condition (e.g., by determining that inlet and outlet temperatures of cooling cycles 420, 440, 460 have stabilized to only fluctuate within a predetermined upper and lower limit). At block 1704, PS 20 can determine (e.g., estimate) a total amount of heat generated by bearing assembly 300 per unit time. PS 20 can do so by determining (i.e., based on) a total amount of cooling performed by cycles 420, 440, 460 on bearing assembly 300 at a steady state condition. PS 20 can determine a total (i.e., aggregate) amount of cooling based on (a) an inlet temperature and/or pressure of each cooling cycle, (b) an outlet temperature and/or pressure of each cooling cycle, and (c) a flow rate of each cooling cycle. The total amount of heat generated per unit time can be called a first heat generation rate.

At block 1706, PS 20 can increase a flow rate of intermediate cycle 460 by a first amount (here, "amount" means magnitude). PS 20 can, in parallel, control inner and outer cycles 420, 440 in the manner(s) discussed above (e.g., the above-discussed two-phase pump or vapor compression controls). At block 1708, PS 20 can re-perform blocks 1702 and 1704 to find a second heat generation rate of bearing assembly 300.

If the second heat generation rate is less than the first heat generation rate, then PS 20 can re-perform block 1708 to find a third heat generation rate of bearing assembly 300, and so on, until an end condition is met (e.g., a maximum flow rate of intermediate cycle 460 has been reached) or until a subsequent heat generation rate exceeds a previous heat generation rate. At block 1710, PS 20 can revert to the previous intermediate cycle 460 flow rate (if the previous heat generation rate is less than the subsequent heat generation rate) or maintain the subsequent intermediate cycle 460 flow rate (if the previous heat generation rate is less than the subsequent heat generation rate).

At block 1712, PS 20 can re-perform blocks 1706, 1708, and 1710 except by decreasing the flow rate of intermediate cycle 460 by a second amount. The second amount can be equal to the first amount if PS 20 only performed block 1706 once when increasing the flow rate of intermediate cycle 460. Otherwise, the second amount can be less than the first amount.

At block 1714, PS 20 can re-perform block 1712, except by increasing the flow rate of intermediate cycle 460 by a third amount, the third amount being less than the first amount. At block 1716, PS 20 can re-perform block 1712, except by decreasing the flow rate of intermediate cycle 460 by a fourth amount, the fourth amount being less than the second amount.

PS 20 can continue looping through blocks 1714 and 1716 until detecting a new condition of gas turbine engine 10 at block 1718 (e.g., a new throttle setting for gas turbine engine 10). At block 1718, PS 20 can select initial conditions of cooling cycles 420, 440, 460 based on the new engine condition (e.g., based on a lookup table). At block 1720, PS 20 can control inner and outer cycles 420, 440 in the manner(s) discussed above (e.g., the above-discussed two-phase pump or vapor compression controls) and return to block 1702.

Figure 9:
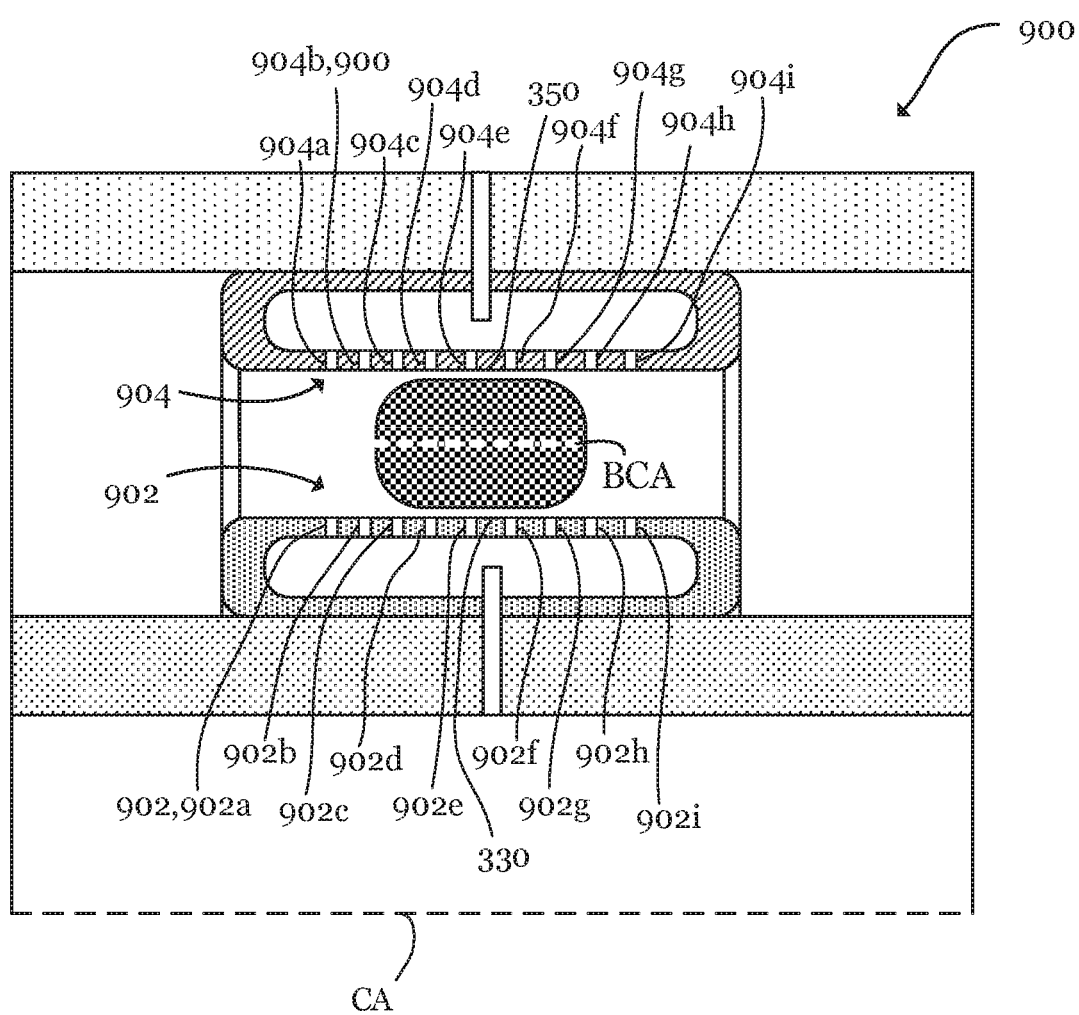
FIG. 9 is a cross-sectional schematic view of the exemplary second cooling architecture.

FIG. 9 illustrates an embodiment of a second cooling architecture 900 (also called a system, a rotational assembly, etc.). Second cooling architecture 900 can share components with first cooling architecture 300. Any features in first cooling architecture 300 can apply to second cooling architecture 900 and vice-versa. As a result, the same element numbers are used across first and second cooling architectures 300, 900. Potential points of departure between cooling architectures 300, 900 are discussed below.

Figure 10:
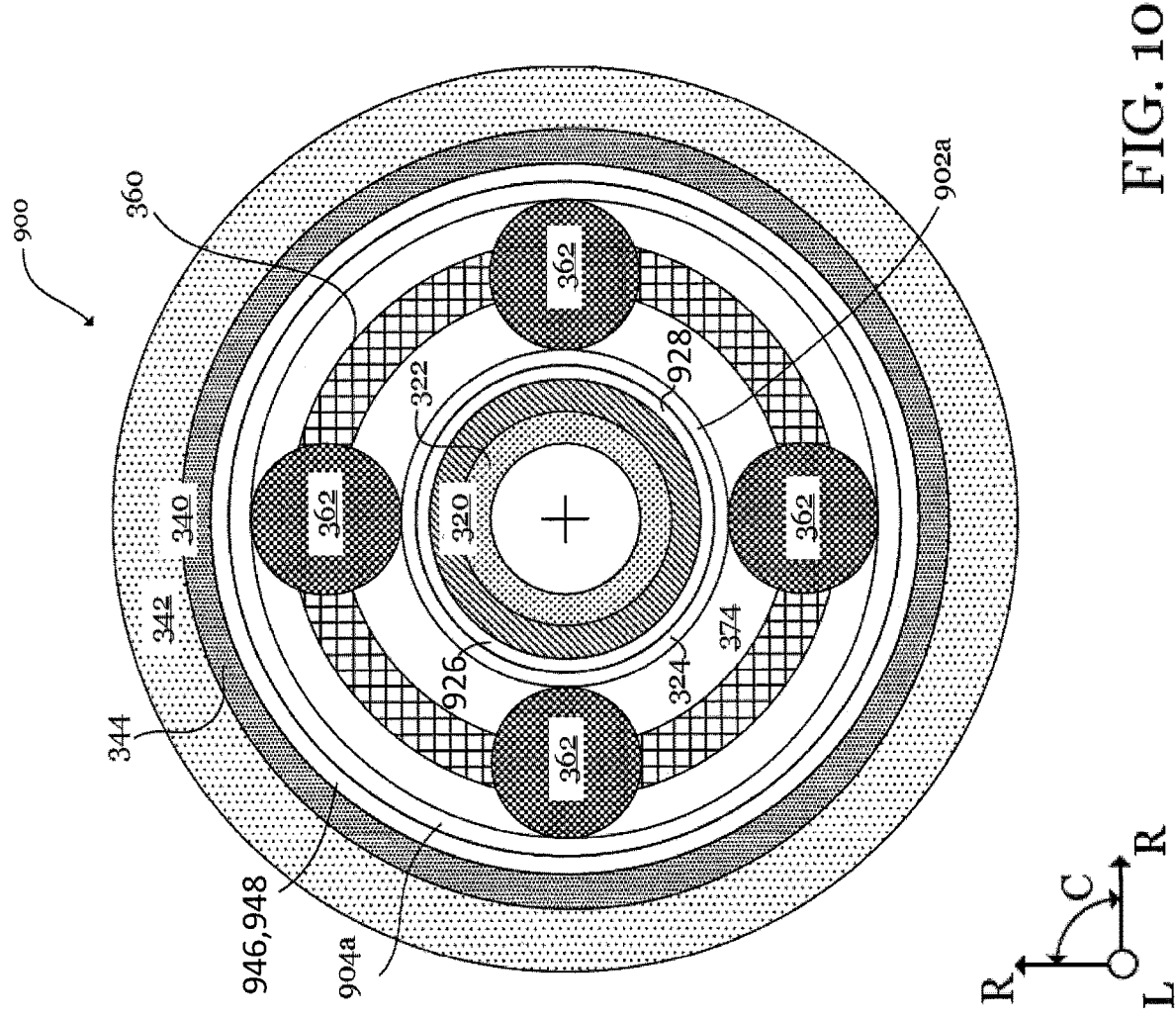
FIG. 10 is a cross-sectional schematic view of the exemplary second cooling architecture.

Referring to FIGS. 9 and 10, inner race 324 can include (e.g., define) a plurality of inner passages 902. Outer race 344 can include a plurality of outer passages 904. Nine inner 902 and nine outer 904 passages are shown and appended with letters "a-i" depending on their longitudinal position. Inner passages 902 can be configured to inject (i.e., pass) inner fluid 928 from inner chamber 926 into circumferential volume 374. Outer passages 904 can be configured to inject outer fluid 948 from outer chamber 946 into circumferential volume 374.

Although not shown, intermediate cooling cycle 460 can be present. In some embodiments however, intermediate cooling cycle 460 is absent such that inner and outer working fluid 928, 948 are the exclusive source cooling and lubrication for bearing assembly 360 (other than air). According to these embodiments inner and outer working fluid 928, 948 can be oil or a refrigerant for a vapor-compression refrigeration cycle.

Figure 11:
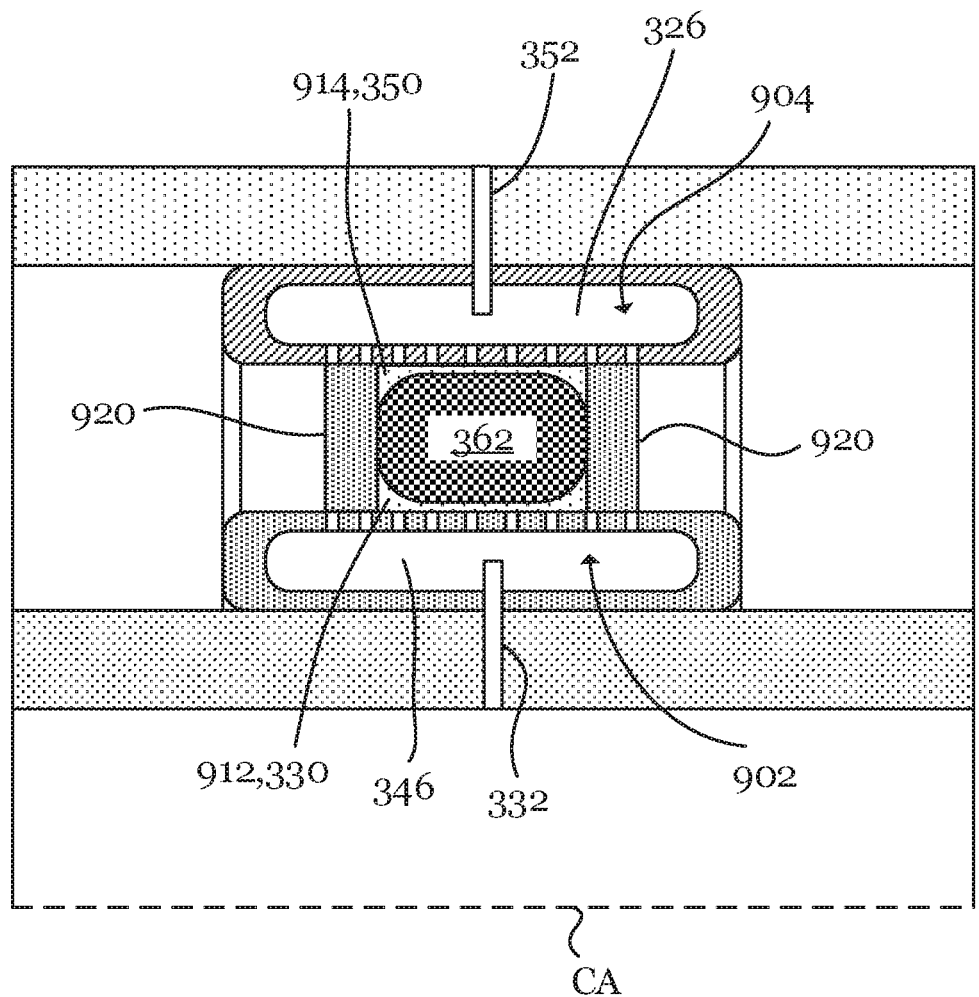
FIG. 11 is a cross-sectional schematic view of the exemplary second cooling architecture.

Referring to FIG. 11, refrigerant injected by passages 902, 904 can form a longitudinally extending circumferential inner cushion 912 at inner contact regions 330 and a longitudinally extending circumferential outer cushion 914 at outer contact regions 350 to minimize (and in some cases, eliminate) friction between bearings 362 and inner race 324 and/or bearings 362 and outer race 344.

Refrigerant injected by passages 902, 904 (or portions thereof) that are circumferentially and/or longitudinally distant from bearings 362 along with refrigerant injected by passages 902, 904 that are co-radial and co-circumferential with bearings 362 can cool bearing assembly 360. To further discourage longitudinal movement of bearings 362, inlets 332, 352 can be disposed at the longitudinal centers of chambers 326, 346 as shown in FIG. 11 to equalize pressure differential (if any) between the longitudinal ends of chambers 326, 346.

Figure 12:
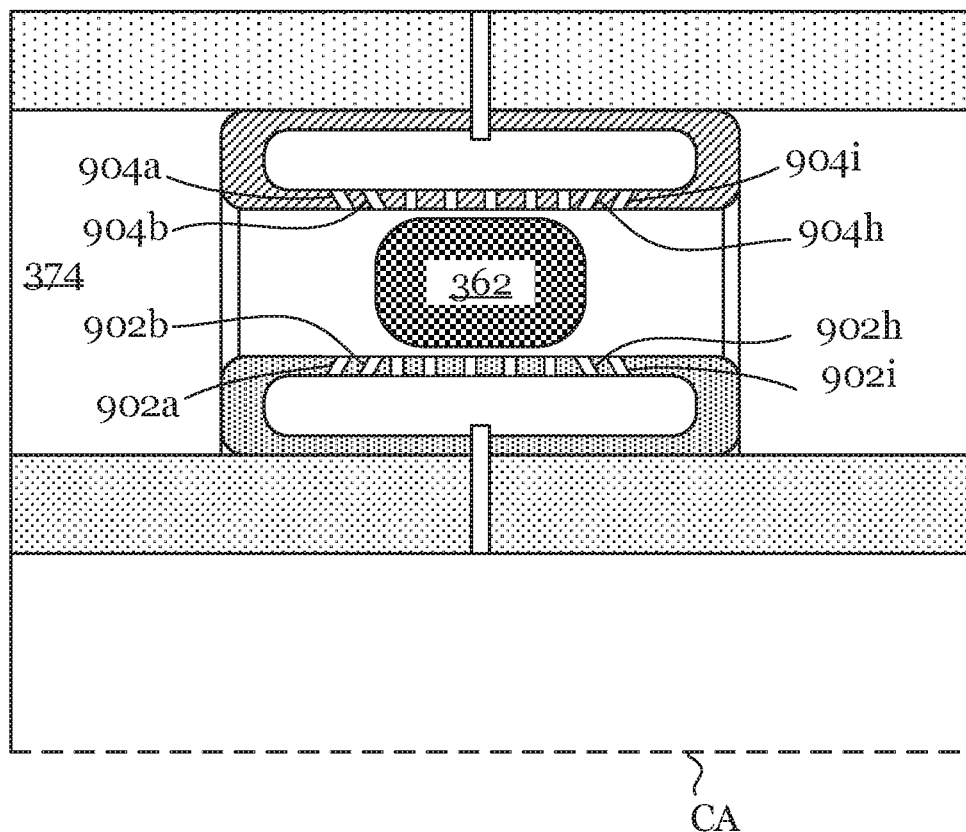
FIG. 12 is a cross-sectional schematic view of the exemplary second cooling architecture.

Referring to FIG. 11, refrigerant injected by passages 902, 904 (or portions thereof) that are circumferentially aligned, but longitudinally distant from bearings 362 can form pressure clouds 920 that longitudinally retain bearings 362. In FIG. 11, the depicted portions of passages 902a, 902b, 902h, 902i, 904a, 904b, 904h, and 904i are circumferentially aligned, but longitudinally distant from bearing 362. As shown in FIG. 12, opposing longitudinal end passages (e.g., 902a, 902i; 902b, 902h; 904a, 904i; 904b, 904h) can be slanted with respect to the radial direction to enhance the retaining effect of pressure clouds 920. Longitudinally central passages (e.g., passages 902c, 902d, 902e, 902f, 902g, 904c, 904d, 904e, 904f, 904g) can remain radially aligned. Therefore, the radial alignment of passages 902, 904 can fluctuate across the longitudinal direction.

Figure 13:
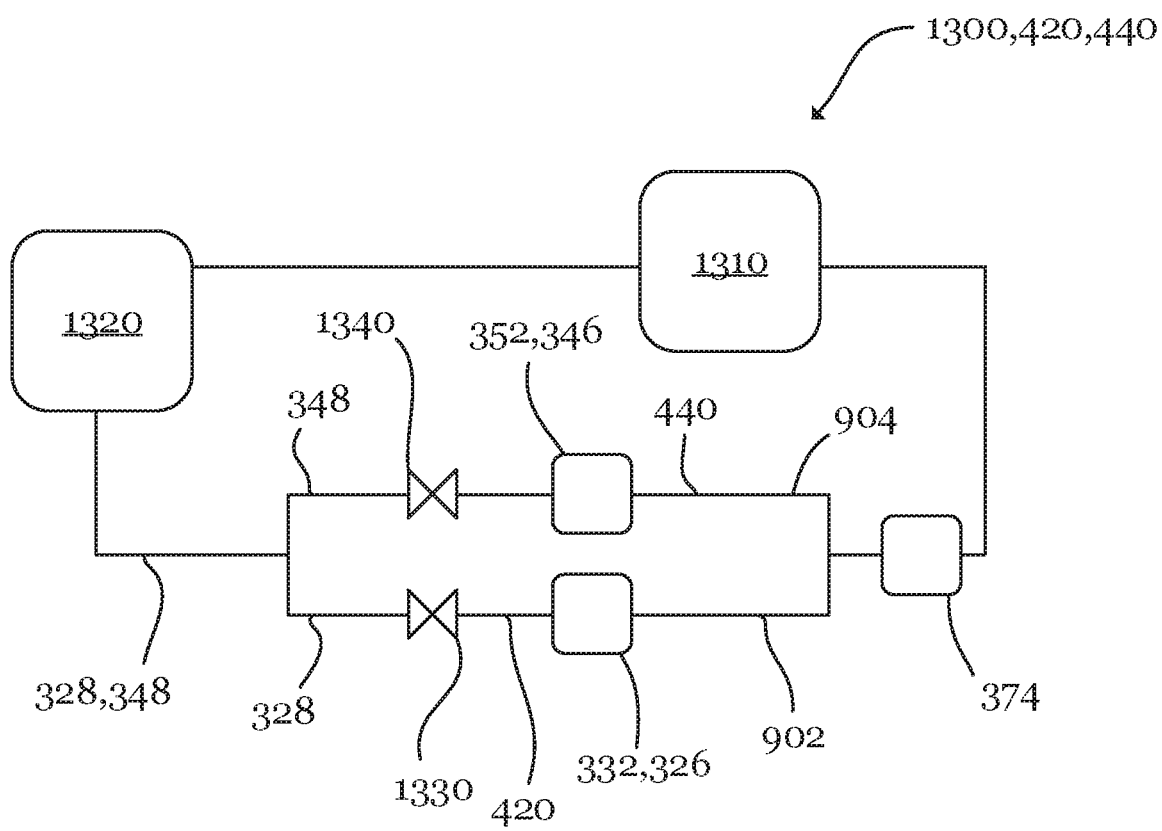
FIGS. 13 and 14 are schematics of exemplary fluid circuits for the first cooling architecture.

FIG. 13 illustrates an embodiment of a vapor-compression system 1300 forming both inner cooling cycle 420 and outer cooling cycle 440. PS 20 can control vapor-compression system 1300. PS 20 can control vapor-compression system 1300 to maintain one or more desired temperature profiles (e.g., to keep one or more temperatures of bearing assembly 300 below predetermined values).

Referring to FIG. 13, PS 20 can control compressor 1310 to pressurize working fluid 328, 348 from a saturated vapor to a super-heated vapor. PS 20 can control condenser 1320 (e.g., by regulating counter-fluid as discussed above) to cool working fluid 328, 348 into a saturated liquid. Working fluid 328, 348 can flow through inlets 332, 352 into annular chambers 326, 346.

PS 20 can control vapor-compression system 1300 such that working fluid 328, 348 within chambers 326, 346 is in a saturated liquid state. Working fluid 328, 348 can depart chambers 326, 346 via passages 902, 904. Immediately upon exiting passages 902, 904 and entering circumferential volume 374, working fluid 328, 348 can expand into a liquid-vapor mixture. Simultaneously, working fluid 328, 348 can absorb heat from bearing assembly 360. Although not shown, one or more passages (e.g., tubes, conduits, etc.) can be disposed in circumferential volume 374 for scavenging working fluid 328, 348. Due to heat absorption, working fluid 328, 348 can reach the scavenging passages in a saturated vapor or superheated vapor state. From there, working fluid 328, 348 can return to compressor 1310.

According to some embodiments, flow control valves 1330, 1340 (e.g., expansion valves) can be disposed between condenser 1320 and chambers 326, 346. According to these embodiments, PS 20 can control condenser 1320 to subcool working fluid 328, 348 and flow control valves 1330, 1340 to expand subcooled liquid working fluid 328, 348 into a saturated liquid state.

Figure 14:
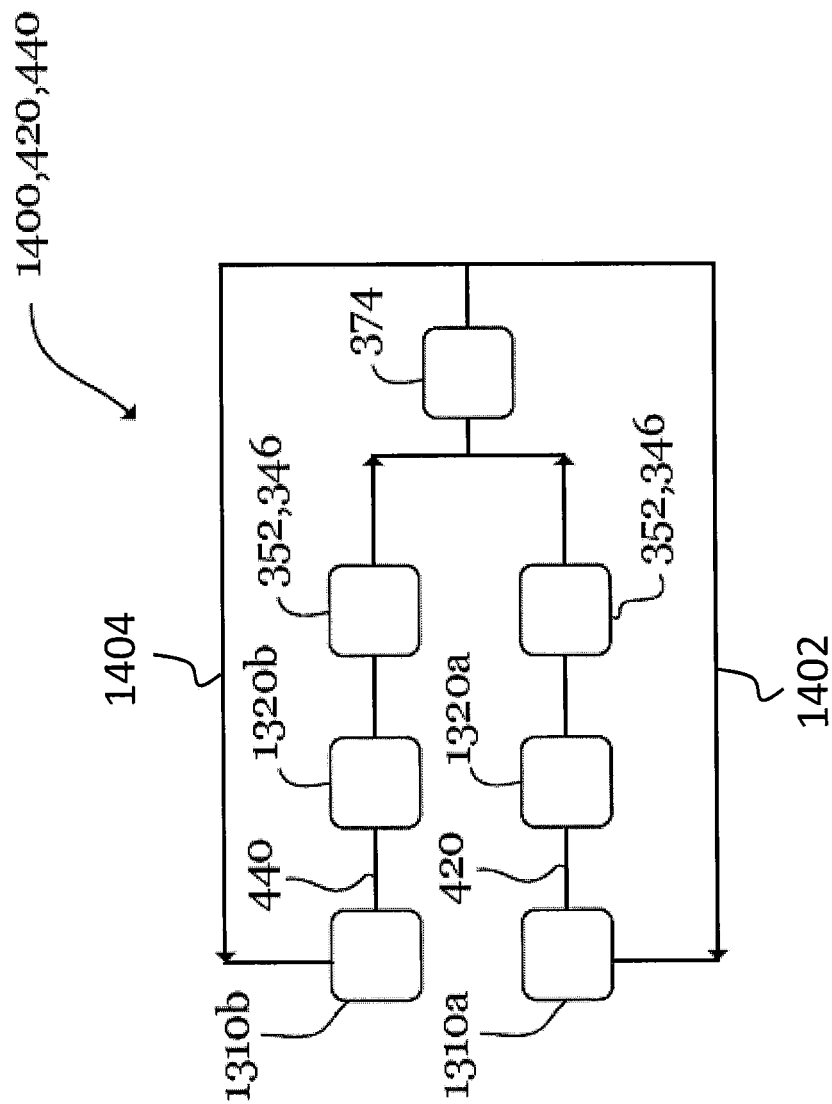

FIG. 14 illustrates an embodiment of a vapor-compression system 1400 forming both inner cooling cycle 420 and outer cooling cycle 440. PS 20 can control vapor-compression system 1400. PS 20 can control vapor-compression system 1400 to maintain one or more desired temperature profiles (e.g., to keep one or more temperatures of bearing assembly 300 below predetermined values).

Referring to FIG. 14, a pair of compressors 1310a, 1310b and a pair of condensers 1320a, 1320b can exist in parallel. Working fluid 328, 348 can mix in circumferential volume 374. Afterwards, passage 1402 can scavenge the mixed working fluid for compressor 1310a and passage 1404 can scavenge the mixed working fluid for compressor 1310b. PS 20 can independently control each compressor 1310a, 1310b such that working fluid 328, 348 enters chambers 326, 346 in a saturated liquid state.

Figure 15:
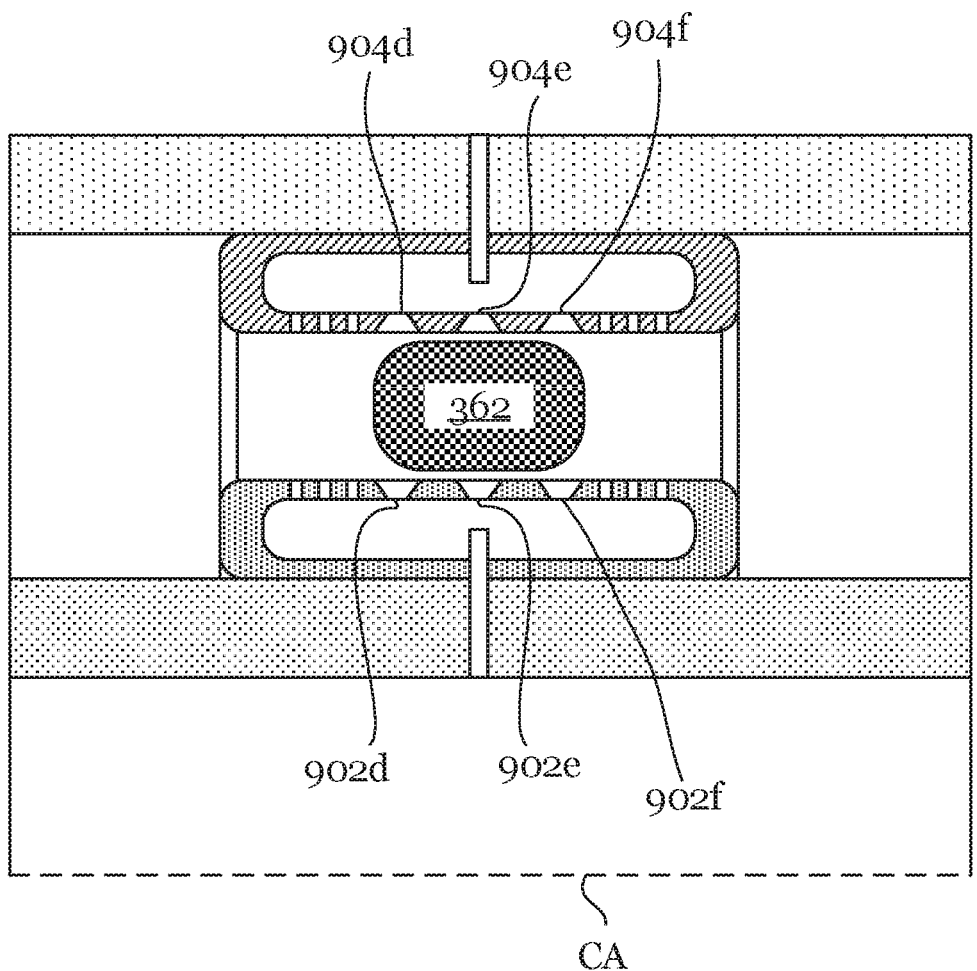
FIG. 15 is a cross-sectional schematic view of the exemplary second cooling architecture.

Referring to FIG. 15, one or more passages 902, 904 can be radially tapered to expand working fluid 328, 348 prior to working fluid 328, 348 reaching circumferential volume 374. According to some embodiments, passages 902, 904 in the longitudinally central area (e.g., passages 902d, 902e, 902f, 904d, 904e, 904f), which produce cushions 912, 914, are tapered to a greater extent than longitudinal end passages (e.g., passages 902a, 902b, 902c, 902g, 902h, 902i, 904a, 904b, 904c, 904g, 904h, 904i). The extent of tapering can be defined by the ratio of passage inlet area to passage outlet area. Therefore, the extent of passage tapering can longitudinally fluctuate. As shown, each tapered passage can have a larger outlet area than inlet area.

As previously discussed with reference to FIG. 5, cooling architectures 300, 900 can include a plurality of co-circumferential inner inlets 332, a plurality of co-circumferential outer inlets 352, a plurality of co-circumferential inner outlets 334, and a plurality of co-circumferential outer outlets 354. According to some embodiments, each inlet 332, 352 can include an independent flow control valve. PS 20 can be configured to control each valve to non-uniformly distribute fresh working fluid 328, 348 into chambers 326, 346. For example, and referring to FIG. 5, based on detecting a higher temperature at region 502, PS 20 can close (i.e., at least partially close) inlets 332a, 332b, and 332c and PS 20 can open (e.g., increase the opening of) inlet 332d. Put differently, PS 20 can control the opening degrees of inlets 332, 352 based on one or more determined (e.g., estimated) temperatures of bearing assembly 300.

Figure 16:
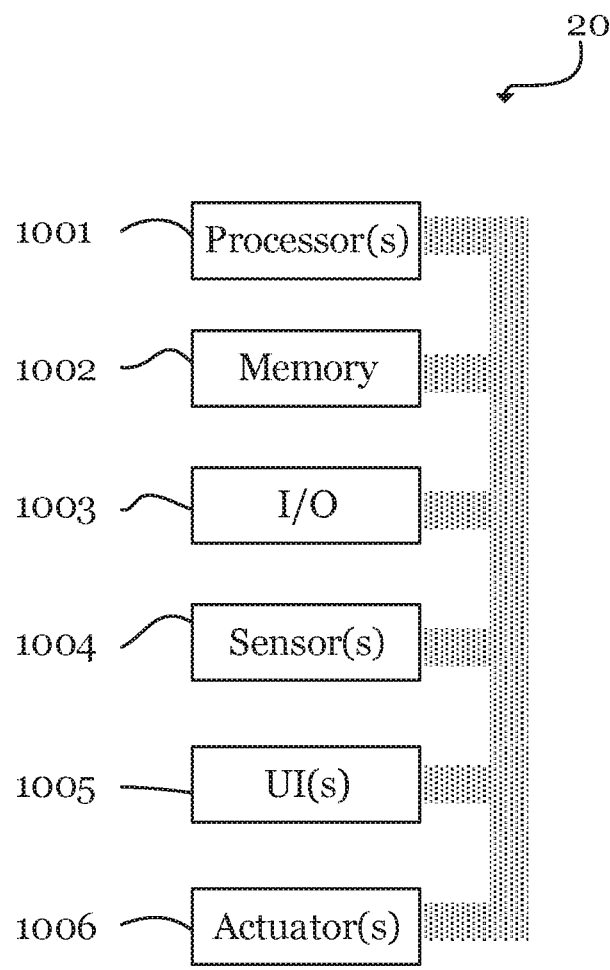
FIG. 16 is a block diagram of an exemplary processing system.

Gas turbine engine 10 and/or electric generator 200 can include a processing system ("PS") 20. Referring to FIG. 16, PS 20 can include one or more processors 1001, memory 1002, one or more input/output devices 1003, one or more sensors 1004, one or more user interfaces 1005, and one or more actuators 1006.

Processors 1001 can include one or more distinct processors, each having one or more cores. Each of the distinct processors can have the same or different structure. Processors 1001 can include one or more central processing units (CPUs), one or more graphics processing units (GPUs), circuitry (e.g., application specific integrated circuits (ASICs)), digital signal processors (DSPs), and the like. Processors 1001 can be mounted on a common substrate or to different substrates.

Processors 1001 are configured to perform a certain function, method, or operation at least when one of the one or more of the distinct processors is capable of executing code, stored on memory 1002 embodying the function, method, or operation. Processors 1001 can be configured to perform any and all functions, methods, and operations disclosed herein.

For example, when the present disclosure states that PS 20 performs/can perform task "X", such a statement should be understood to disclose that PS 20 can be configured to perform task "X". Mobile device 100 and PS 20 are configured to perform a function, method, or operation at least when processors 1001 are configured to do the same.

Memory 1002 can include volatile memory, non-volatile memory, and any other medium capable of storing data. Each of the volatile memory, non-volatile memory, and any other type of memory can include multiple different memory devices, located at multiple distinct locations and each having a different structure.

Examples of memory 1002 include a non-transitory computer-readable media such as RAM, ROM, flash memory, EEPROM, any kind of optical storage disk such as a DVD, a Blu-Ray® disc, magnetic storage, holographic storage, an HDD, an SSD, any medium that can be used to store program code in the form of instructions or data structures, and the like. Any and all of the methods, functions, and operations described in the present application can be fully embodied in the form of tangible and/or non-transitory machine-readable code saved in memory 1002.

Input-output devices 1003 can include any component for trafficking data such as ports, antennas (i.e., transceivers), printed conductive paths, and the like. Input-output devices 1003 can enable wired communication via USB®, DisplayPort®, HDMI®, Ethernet, and the like. Input-output devices 1003 can enable electronic, optical, magnetic, and holographic, communication with suitable memory 1003. Input-output devices 1003 can enable wireless communication via WiFi®, Bluetooth®, cellular (e.g., LTE®, CDMA®, GSM®, WiMax®, NFC®), GPS, and the like. Input-output devices 1003 can include wired and/or wireless communication pathways.

Sensors 1004 can capture physical measurements of environment and report the same to processors 1001. Examples of sensors 1004 include pressure sensors, temperature sensors, and flow rate sensors, which can be disposed at any (e.g., every) point in the cooling circuit diagrams. User interface 1005 can include display 120 (e.g., LED touchscreens (e.g., OLED touchscreens), physical buttons, speakers, microphones, keyboards, and the like. Actuators 1006 can enable processors 1001 to control mechanical forces. For example, actuators can be electronically controllable motors disposed in pumps, valves, and compressors. Every valve, pump, and compressor discussed herein can be independently controllable by PS 20 based on pressure and/or temperature measurements.

PS 20 can be distributed. For example, some elements of PS 20 can be disposed inside an aircraft body while other elements of PS 20 can be disposed in gas turbine engine 10. PS 20 can have a modular design where certain features have a plurality of the aspects shown in FIG. 16. For example, I/O modules can include volatile memory and one or more processors.

What is claimed is:

1. A cooling architecture comprising:
   a longitudinally extending radially inner shaft comprising an inner race, the inner race defining an inner circumferential chamber configured to carry an inner working fluid, wherein the inner shaft is at least partially hollow;
   a fluid line extending through the hollow inner shaft and configured to deliver inner working fluid to the inner circumferential chamber;

a radially outer support comprising an outer race that defines an outer circumferential chamber configured to carry an outer working fluid;
a bearing assembly comprising a plurality of roller bearings disposed radially between the inner race and the outer race, the bearing assembly configured to radially align the inner shaft with respect to the outer support;
a plurality of co-circumferential inner inlets configured to deliver inner working fluid to the inner circumferential chamber; and
a processing system configured to independently adjust a flow rate of inner working fluid through each of the inner inlets such that a flow rate of inner working fluid through a first inner inlet is lower than a flow rate of inner working fluid through a second co-circumferential inner inlet.

2. The cooling architecture of claim 1, wherein the processing system is configured to:
determine a temperature and/or pressure of inner working fluid entering the inner circumferential chamber;
control at least one of a compressor, a liquid pump, and a valve such that inner working fluid entering the inner circumferential chamber is in a saturated liquid state.

3. The cooling architecture of claim 2, wherein the processing system is configured to:
determine a temperature and/or pressure of inner working fluid departing the inner circumferential chamber;
control at least one of a compressor, a liquid pump, and a valve such that inner working fluid departing the inner circumferential chamber is in a saturated vapor state.

4. The cooling architecture of claim 1, wherein the inner circumferential chamber comprises a U-shaped void defined in the inner race.

5. The cooling architecture of claim 1 comprising a helical baffle disposed in the inner circumferential chamber.

6. The cooling architecture of claim 1 wherein the inner shaft comprises a inner body and the inner race is a rotor mounted to the cylindrical inner body, the inner race comprising an inner race running surface configured to contact the roller bears and an inner race mounting surface configured to contact the inner body;
the inner circumferential chamber being defined such that at least some of the inner working fluid within the circumferential chamber is closer to the inner race running surface than the inner race mounting surface.

7. The cooling architecture of claim 1 comprising one or more fluid lines for supply the inner working fluid into the inner circumferential chamber and an intermediate working fluid into direct contact with the roller bearings, the intermediate working fluid cooling and lubricating the roller bearings;
a processing system configured to:
determine heat generated from roller bearing frictional contact;
modulate the supply of the intermediate working fluid to minimize the generated heat;
determine a difference between a cooling capacity of the intermediate working fluid and the minimized heat generation;
modulate the supply of the inner working fluid based on the determined difference.

8. The cooling architecture of claim 1, wherein the processing system is configured to modulate the supplies of the inner and intermediate working fluids by controlling one or more fluid valves and/or controlling one or more fluid pumps.

9. The cooling architecture of claim 1 wherein the inner shaft comprises a inner body and the inner race is a rotor mounted to the cylindrical inner body, the inner race comprising an inner race running surface configured to contact the roller bears and an inner race mounting surface configured to contact the inner body;
the inner circumferential chamber being defined such that at least some of the inner working fluid within the circumferential chamber is closer to the inner race running surface than the inner race mounting surface.

10. In a gas turbine engine, a method comprising:
determining frictional heat generation of a bearing assembly radially disposed between an inner component and an outer component, at least one of the inner component and the outer component comprising a rotating shaft, the bearing assembly radially supporting the rotating shaft;
modulating flow of an intermediate working fluid to minimize the frictional heat generation, the intermediate working fluid directly lubricating and cooling the bearing assembly;
modulating flow of a second working fluid based on the minimized frictional heat generation and a cooling capacity of the intermediate working fluid at the modulated flow.

11. The method of claim 10 comprising:
decreasing cooling capacity of the intermediate working fluid to minimize frictional heat generation while increasing cooling capacity of the second working fluid.

12. The method of claim 11 wherein the intermediate working fluid and the second working fluid mix at a downstream location, the intermediate working fluid and the second working fluid representing different flow paths of the same fluid.

13. A method of using a cooling architecture, the method comprising:
flowing an inner working fluid through an inner circumferential chamber defined in an inner race of a longitudinally extending radially inner shaft;
wherein the cooling architecture comprises:
a radially outer support comprising an outer race; and
a bearing assembly comprising a plurality of roller bearings disposed radially between the inner race and the outer race, the bearing assembly radially aligning the inner shaft with respect to the outer support;
determining a temperature and/or pressure of inner working fluid entering the inner circumferential chamber; and
controlling at least one of a compressor, a liquid pump, and a valve such that inner working fluid entering the inner circumferential chamber is in a saturated liquid state.

14. The method of claim 13 comprising flowing an outer working fluid through an outer circumferential chamber defined in the outer race and flowing an intermediate working fluid into direct contact with the roller bearings.

15. The method of claim 13, wherein the inner working fluid flows through a fluid line extending through the radially inner shaft before reaching the inner circumferential chamber.

16. A cooling architecture comprising:
a longitudinally extending radially inner shaft comprising an inner race, the inner race defining an inner circumferential chamber configured to carry an inner working fluid;

a radially outer support comprising an outer race;
a bearing assembly comprising a plurality of roller bearings disposed radially between the inner race and the outer race, the bearing assembly configured to radially align the inner shaft with respect to the outer support;
wherein the inner circumferential chamber comprises a U-shaped void defined in the inner race.

17. The cooling architecture of claim 16 comprising a helical baffle disposed in the inner circumferential chamber.

18. A method of using a cooling architecture, the method comprising:
flowing an inner working fluid through an inner circumferential chamber defined in an inner race of a longitudinally extending radially inner shaft;
wherein the cooling architecture comprises:
a radially outer support comprising an outer race; and
a bearing assembly comprising a plurality of roller bearings disposed radially between the inner race and the outer race, the bearing assembly radially aligning the inner shaft with respect to the outer support, and wherein the inner circumferential chamber comprises a U-shaped void defined in the inner race.

\* \* \* \* \*